(12) United States Patent
Chou

(10) Patent No.: US 9,057,382 B2
(45) Date of Patent: Jun. 16, 2015

(54) FAN IMPELLER STRUCTURE AND MANUFACTURING METHOD THEREOF

(75) Inventor: Chu-Hsien Chou, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 585 days.

(21) Appl. No.: 13/364,293

(22) Filed: Feb. 1, 2012

(65) Prior Publication Data

US 2013/0195637 A1 Aug. 1, 2013

(51) Int. Cl.
*F03B 3/02* (2006.01)
*F04D 25/06* (2006.01)
*B29C 45/14* (2006.01)
*B29L 31/08* (2006.01)

(52) U.S. Cl.
CPC ......... *F04D 25/064* (2013.01); *Y10T 29/49332* (2015.01); *B29C 45/14336* (2013.01); *B29C 45/14344* (2013.01); *B29L 2031/08* (2013.01)

(58) Field of Classification Search
CPC ............... F04D 29/602; F04D 25/064; B29C 45/14344; B29C 45/14336; Y10T 29/49332; B29L 2031/08
USPC .............................. 416/3; 310/156.12, 156.13
See application file for complete search history.

(56) References Cited

U.S. PATENT DOCUMENTS

| | | | | |
|---|---|---|---|---|
| 8,182,220 | B2 * | 5/2012 | Li et al. ........................ | 415/229 |
| 8,593,027 | B2 * | 11/2013 | Marchitto et al. ....... | 310/156.12 |
| 2006/0012255 | A1 * | 1/2006 | Ku et al. ......................... | 310/58 |
| 2007/0114857 | A1 * | 5/2007 | Liu ................................ | 310/58 |
| 2011/0095642 | A1 * | 4/2011 | Enomoto et al. ....... | 310/216.045 |

* cited by examiner

*Primary Examiner* — Dwayne J White
*Assistant Examiner* — Jason Fountain
(74) *Attorney, Agent, or Firm* — C. G. Mersereau; Nikolai & Mersereau, P.A.

(57) ABSTRACT

A fan impeller structure and a manufacturing method thereof. The fan impeller structure includes a hub and multiple securing sections. The hub has a top section, an annular section and multiple recesses. The annular section axially extends from a circumference of the top section. The annular section and the top section together define a receiving space. The recesses are formed at a junction between the top section and the annular section. The securing sections are disposed in the receiving space and formed oppositely between the recesses. The manufacturing method of the fan impeller structure enables the manufacturing process to be simplified. Moreover, by using the securing sections, magnetic members can be quickly connected with and secured to inner circumference of the hub to save working time.

4 Claims, 7 Drawing Sheets

FAN IMPELLER STRUCTURE AND MANUFACTURING METHOD THEREOF

BACKGROUND OF THE INVENTION

1. Field of the Invention

The present invention relates to a fan impeller structure and a manufacturing method thereof. The fan impeller structure includes a hub and multiple securing sections. By means of the manufacturing method of the fan impeller structure, the manufacturing process is simplified. Moreover, by means of the securing sections, magnetic members can be quickly connected with and secured to inner circumference of the hub to save working time.

2. Description of the Related Art

Following the popularization of personal computers and rapid advance of computer industries, various electronic components have been developed. In operation, the electronic components will generate high heat. Therefore, it has become a critical issue how to quickly dissipate the heat generated by the electronic components. There is a trend to use DC brushless fan as a main heat dissipation component. The DC brushless fan has simplified structure and small volume and is able to quickly dissipate the heat generated by the electronic components. Therefore, various DC brushless fans are currently widely used in the field of computers.

A conventional DC brushless fan mainly includes a rotor and a stator. The rotor is composed of a hub and permanent magnetic irons. The stator is composed of silicon steel sheets, windings and printed circuit board (PCB). Through the induction and magnetization between the permanent magnetic irons of the rotor and the corresponding silicon steel sheets and the windings wound on the silicon steel sheets, the fan can operate to dissipate the heat.

In the conventional DC brushless fan, a manufacturer often employs multiple tile-shaped permanent magnetic irons and assembles these tile-shaped permanent magnetic irons with the hub instead of a block of permanent magnetic iron to achieve greater magnetic force in accordance with the requirements of an installation situation. This leads to a problem that in manufacturing and assembling process of the hub and the tile-shaped permanent magnetic irons, it costs much time to arrange the tile-shaped permanent magnetic irons inside the hub at equal intervals. It is hard to precisely position the tile-shaped permanent magnetic irons and control the intervals between the tile-shaped permanent magnetic irons.

To solve the above problem, the manufacturer often adds some securing members or tools to the hub for more precisely positioning the tile-shaped permanent magnetic irons and controlling the intervals therebetween. However, with such securing members, the tile-shaped permanent magnetic irons still can be hardly truly positioned. Moreover, this leads to complication of the manufacturing process, increase of working time and increase of the ratio of defective products.

According to the above, the conventional technique has the following shortcomings:

1. The working time is increased.
2. The manufacturing process is complicated.
3. The ratio of defective products is increased.

SUMMARY OF THE INVENTION

A primary object of the present invention is to provide a fan impeller structure the manufacturing method of which is simplified.

A further object of the present invention is to provide the above fan impeller structure in which magnetic members can be quickly connected with and secured to inner circumference of the hub to save working time and increase the ratio of good products.

A still further object of the present invention is to provide the above fan impeller structure, which has better heat dissipation effect.

A still further object of the present invention is to provide a manufacturing method of a fan impeller structure, which is simplified.

To achieve the above and other objects, the fan impeller structure of the present invention includes a hub and multiple securing sections. The hub has a top section, an annular section and multiple recesses. The annular section axially extends from a circumference of the top section. The annular section and the top section together define a receiving space. The recesses are formed at a junction between the top section and the annular section. Each recess has at least one through hole in communication with the receiving space. The securing sections are disposed in the receiving space and formed oppositely between the recesses. By means of the securing sections, magnetic members can be conveniently assembled with and secured to the inner circumference of the hub to save working time.

The manufacturing method of the fan impeller structure includes steps of: providing a hub having an end face formed with multiple recesses; placing the hub into a mold with at least one mold cavity, by means of injection molding, a plastic material being filled through two through holes formed on opposite sides of each recess into the hub to form multiple securing sections on inner circumference of the hub; and separating the hub from the mold. By means of the manufacturing method of the fan impeller structure, the manufacturing process is simplified and the working time is saved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
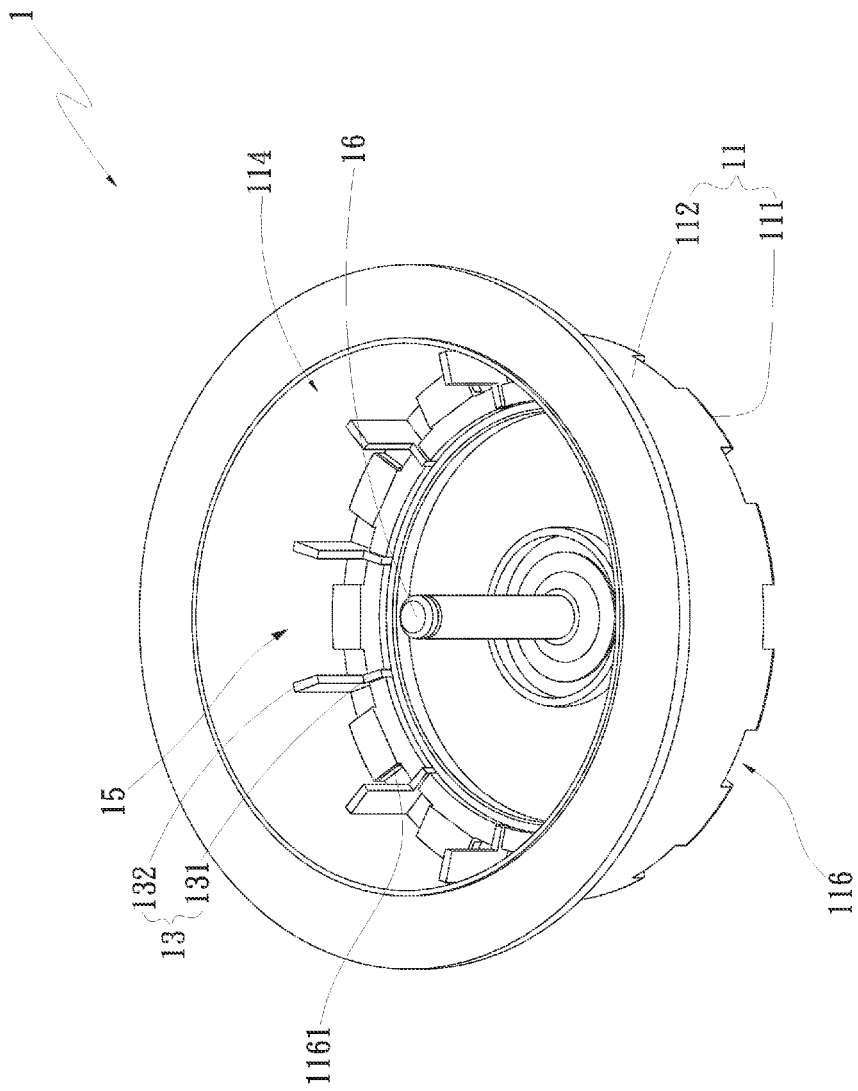
FIG. 1 is a perspective view of a first embodiment of the fan impeller structure of the present invention.
Figure 2:
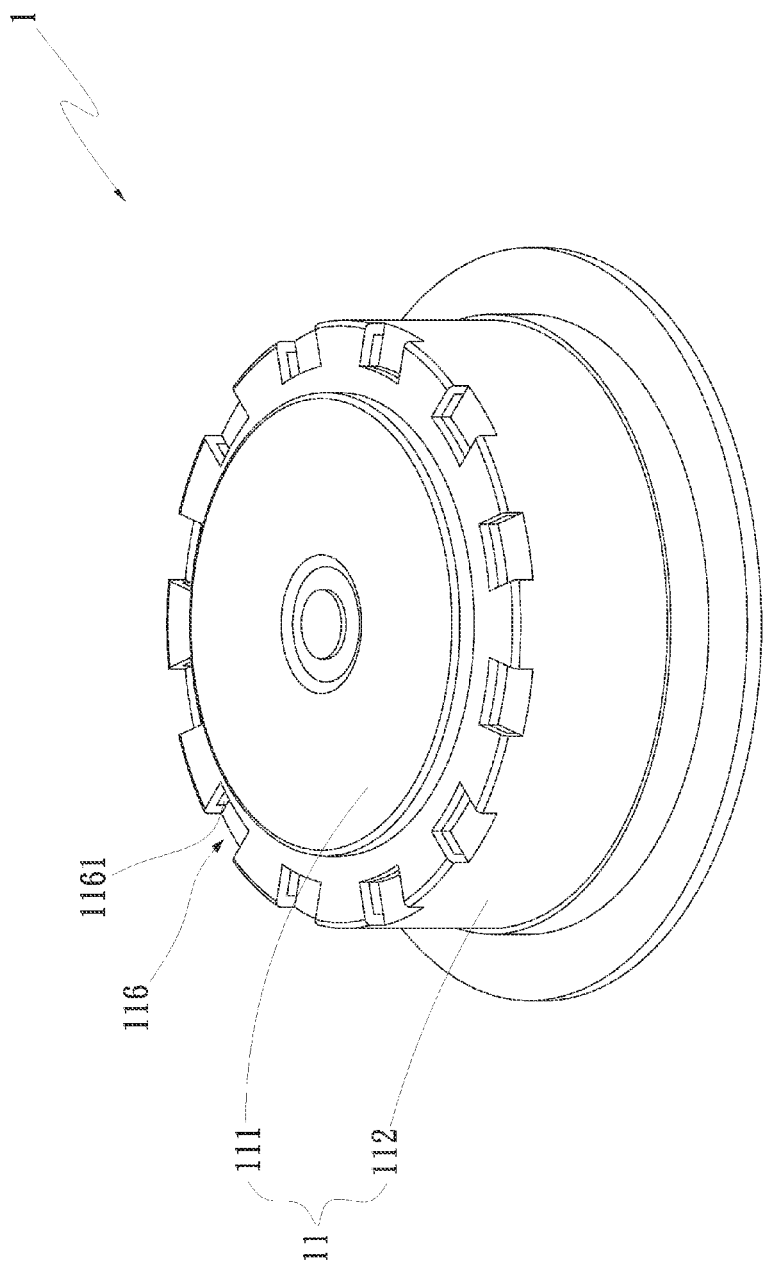
FIG. 2 is another perspective view of the first embodiment of the fan impeller structure of the present invention.
Figure 2A:
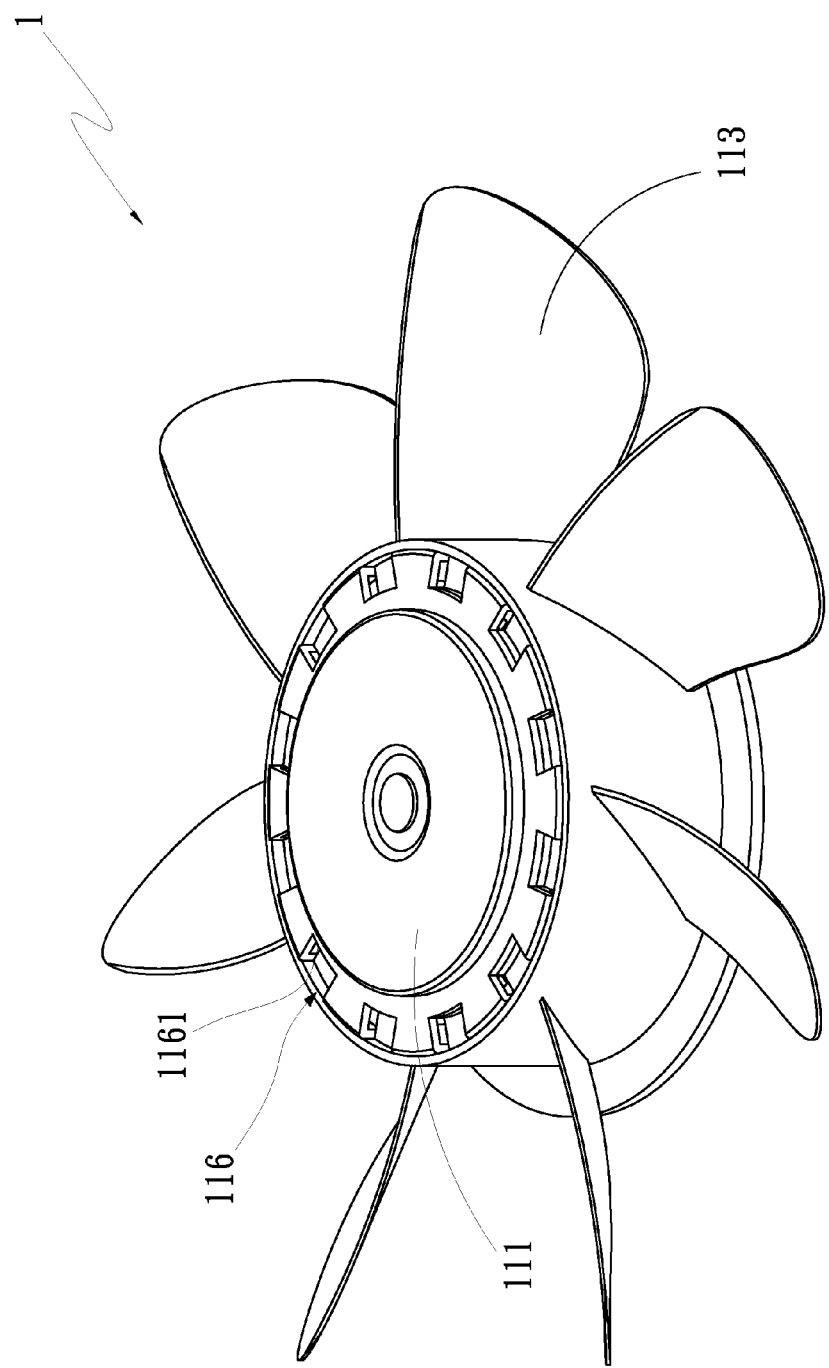
FIG. 2A is another perspective view of the first embodiment of the fan impeller structure of the present invention.

Please refer to FIGS. 1, 2 and 2A. FIG. 1 is a perspective view of a first embodiment of the present invention. FIG. 2 is another perspective view of the first embodiment of the present invention. FIG. 2A is another perspective view of the first embodiment of the fan impeller structure of the present invention. According to the first embodiment, the fan impeller structure 1 of the present invention includes a hub 11, a shaft 16, multiple blades 113 and multiple securing sections 13. The hub 11 has a top section 111, an annular section 112 and multiple recesses 116. The annular section 112 axially extends from a circumference of the top section 111. The blades 113 are annularly arranged along an outer circumference of the annular section 112. The annular section 112 and the top section 111 together define a receiving space 114.

One end of the shaft 16 is inserted in one side of the top section 111. That is, the shaft 16 axially extends from inner side of the top section 111 into the receiving space 114. The recesses 116 are, but not limited to, formed at the junction between the top section 111 and the annular section 112 and arranged along the circumference of the top section 111 at equal intervals. Alternatively, the recesses 116 can be arranged at unequal intervals.

Each recess 116 has at least one through hole 1161 formed on opposite sides of the recess 116 in communication with the receiving space 114. A plastic material can be filled into the receiving space 114 through the through holes 1161 to form the securing sections 13 by means of injection molding. In practice, in operation of the fan impeller, the heat generated by such as the shaft 16 and the stator in the receiving space 114 of the hub 11 can be quickly dissipated through the through holes 1161 to achieve heat dissipation (exhaustion) effect.

Figure 3:
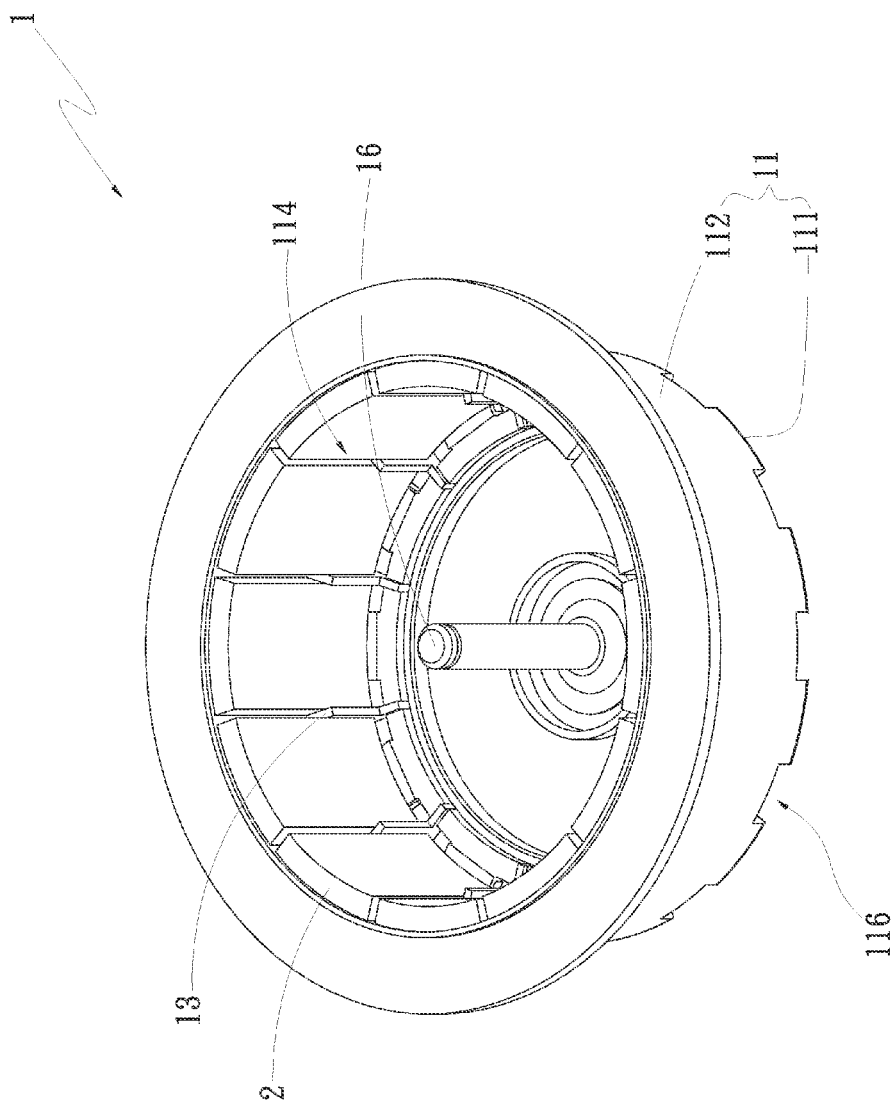
FIG. 3 is a perspective assembled view of the first embodiment of the fan impeller structure of the present invention.
Figure 4:
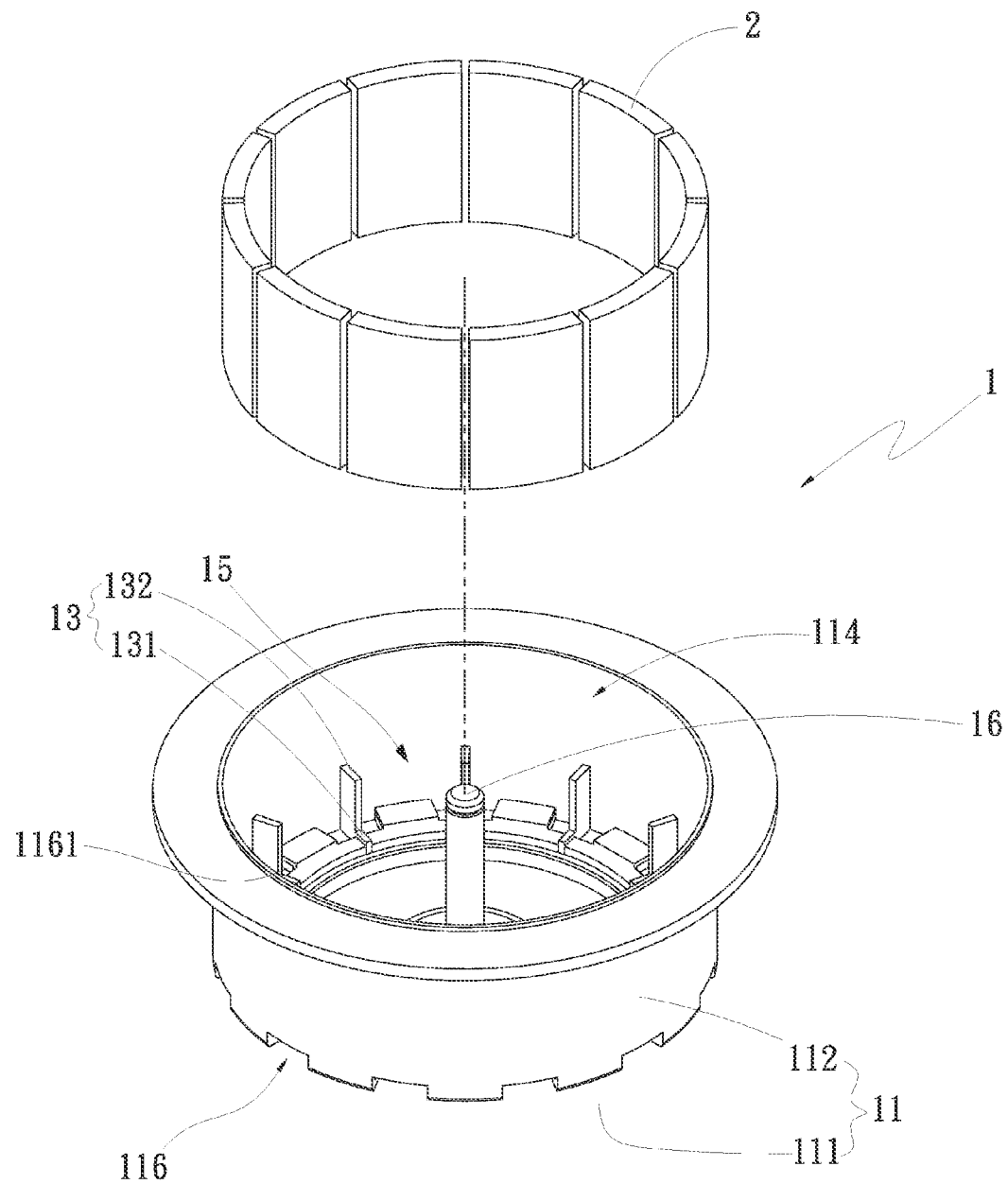
FIG. 4 is a perspective assembled view of the first embodiment of the fan impeller structure of the present invention.

Please now refer to FIGS. 3 and 4. The securing sections 13 are disposed in the receiving space 114 and formed oppositely between the recesses 116. Each securing section 13 has a fixed end 131 and an extension end 132. The fixed end 131 is formed in the receiving space 114 on the inner side of the top section 111 oppositely between each two adjacent recesses 116. The extension end 132 axially extends from the fixed end 131 along the annular section 112 in adjacency to an inner circumference of the annular section 112.

Each two adjacent securing sections 13 define therebetween a receiving room 15 in communication with the receiving space 15 for receiving a corresponding magnetic member 2. The magnetic member 2 is a magnetic iron or a permanent magnetic iron (such as a tile-shaped permanent magnetic iron). In this embodiment, the receiving rooms 15 are, but not limited to, arranged at equal intervals for illustration purposes only. In practice, the distances (or intervals) between the recesses 116 can be modified according to the necessary magnitude of the magnetic force and the number of the magnetic members 2 so as to adjust the size of the receiving rooms 15.

The securing sections 13 serve to secure the corresponding magnetic members 2, whereby the magnetic members 2 can be quickly assembled with and located on the inner circumference of the hub 11 to save assembling time.

The securing sections 13 are integrally connected with the hub 11 for receiving the corresponding magnetic members 2. Therefore, the magnetic members 2 can be conveniently mounted on the hub 11 to save working time and promote the ratio of good products.

Figure 5:
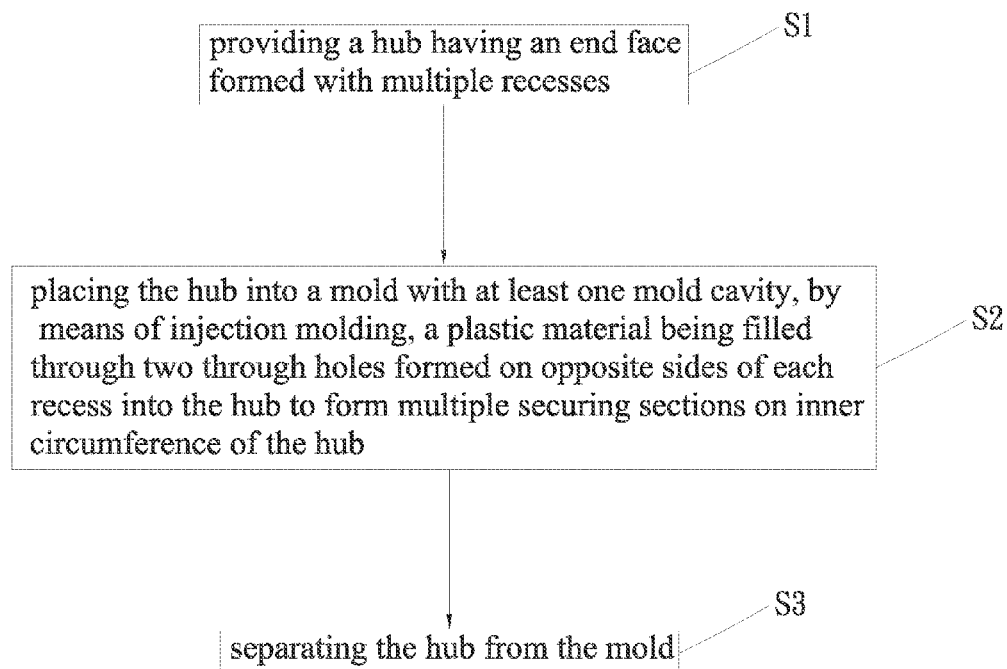
FIG. 5 is a flow chart of a first embodiment of the manufacturing method of the fan impeller structure of the present invention.

Please refer to FIG. 5, which is a flow chart of the manufacturing method of the fan impeller structure of the present invention. Also referring to FIGS. 1 and 2, the manufacturing method of the fan impeller structure of the present invention includes steps of:

S1: providing a hub having an end face formed with multiple recesses, a hub 11 having an end face formed with multiple recesses 116 being provided, the recesses 116 being formed on the end face of the hub 11 in adjacency to a circumference of the hub 11, (that is, recesses 116 being formed at a junction between a top section 111 and an annular section 112 of the hub 11);

S2: placing the hub into a mold with at least one mold cavity, by means of injection molding, a plastic material being filled through two through holes formed on opposite sides of each recess into the hub to form multiple securing sections on inner circumference of the hub, the hub 11 being placed into a mold (not shown) with at least one mold cavity, by means of injection molding, a plastic material being filled into a receiving space 114 of the hub 11 through two through holes 1161 formed on opposite sides of each recess 116, whereby the plastic material flows from the through holes 1161 to a position oppositely between the recesses 116 to form the securing sections 13 on the inner circumference of the hub 11; and S3: separating the hub from the mold, the hub 11 with the molded securing sections 13 being separated (or detaching) from the mold.

According to the above arrangement, by means of injection molding, the plastic material is filled through the through holes 1161 of the recesses 116 to a position oppositely between the recesses 116 to form the securing sections 13 on the inner circumference of the hub 11. The securing sections 13 serve to integrally secure the corresponding magnetic members 2, whereby the magnetic members 2 can be quickly connected with and secured to the inner circumference of the hub 11 to simplify the assembling process (securing process). Moreover, the positions of the securing sections 13 can be adjusted to adjust the intervals between the securing sections 13. Therefore, the magnetic members 2 can be conveniently mounted on the hub 11 to save working time and promote the ratio of good products.

Figure 6:
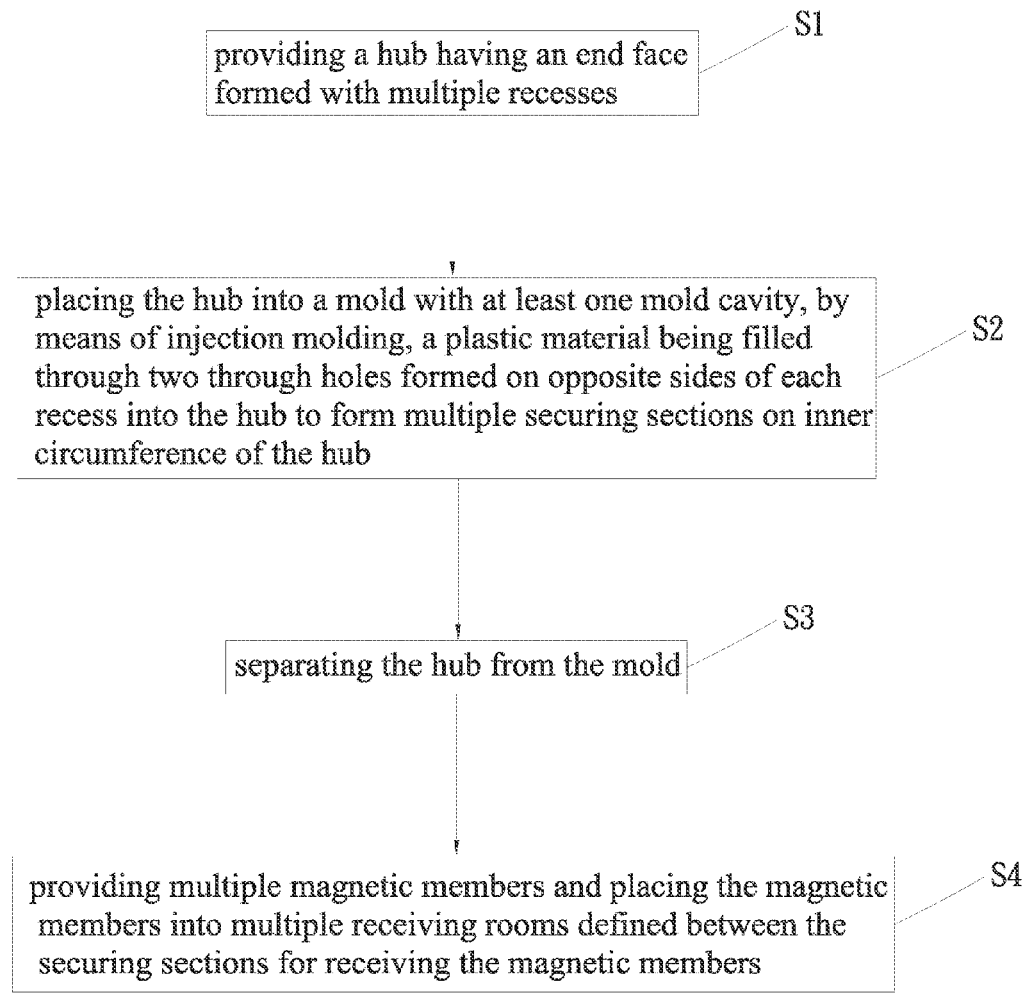
FIG. 6 is a flow chart of a second embodiment of the manufacturing method of the fan impeller structure of the present invention.

Please refer to FIG. 6, which is a flow chart of a second embodiment of the manufacturing method of the fan impeller structure of the present invention. Also referring to FIGS. 3 and 4, according to the second embodiment, the manufacturing method of the fan impeller structure of the present invention includes steps of:

S1: providing a hub having an end face formed with multiple recesses;

S2: placing the hub into a mold with at least one mold cavity, by means of injection molding, a plastic material being filled through two through holes formed on opposite sides of each recess into the hub to form multiple securing sections on inner circumference of the hub; and S3: separating the hub from the mold.

The steps S1 to S3 of the second embodiment are identical to those of the first embodiment and thus will not be repeatedly described hereinafter. The second embodiment is different from the first embodiment in that after step S3, the second embodiment further includes a step S4 of providing multiple magnetic members and placing the magnetic members into multiple receiving rooms defined between the securing sections for receiving the magnetic members. Accordingly, the magnetic members 2 are received in the receiving rooms 15 defined between the securing sections 13 and securely located between the securing sections 13. The magnetic member 2 is a magnetic iron or a permanent magnetic iron (such as a tile-shaped permanent magnetic iron).

According to the above, in comparison with the conventional technique, the present invention has the following advantages:

1. The manufacturing process is simplified.
2. The working time is saved.
3. The ration of good products is increased.

The above embodiments are only used to illustrate the present invention, not intended to limit the scope thereof. It is understood that many changes and modifications of the above embodiments can be made without departing from the spirit of the present invention. The scope of the present invention is limited only by the appended claims.

What is claimed is:

1. A fan impeller structure comprising:

a hub having a top section, an annular section and multiple recesses, the annular section axially extending from a circumference of the top section, the annular section and the top section together defining a receiving space, the recesses being formed at a junction between the top section and the annular section and arranged along the circumference of the top section, each recess having a plurality of through holes in communication with the receiving space, the through holes being formed on opposite sides of the recess; and multiple securing sections disposed in the receiving space and formed oppositely between the recesses;

wherein each securing section has a fixed end and an extension end, the fixed end being formed on an inner side of the top section oppositely between each two adjacent recesses, the extension end axially extending from the fixed end along the annular section in adjacency to an inner circumference of the annular section;

wherein each two adjacent securing sections define therebetween a receiving room in communication with the receiving space for receiving a corresponding magnetic member; and wherein the through holes correspond to desired locations of the securing sections to enable filling of a plastic material into the receiving space to form the securing sections.

2. The fan impeller structure as claimed in claim 1, further comprising a shaft and multiple blades, one end of the shaft being connected to an inner side of the top section, whereby the shaft extending from the inner side of the top section into the receiving space, the blades being annularly arranged along an outer circumference of the annular section.

3. The fan impeller structure as claimed in claim 1, wherein the magnetic members are magnetic irons or permanent magnetic irons.

4. The fan impeller structure as claimed in claim 1, wherein the recesses are formed at the junction between the top section and the annular section and arranged along the circumference of the top section at equal intervals.

\* \* \* \* \*